(12) United States Patent
Togashi et al.

(10) Patent No.: US 6,995,967 B2
(45) Date of Patent: Feb. 7, 2006

(54) STACKED CAPACITOR

(75) Inventors: Masaaki Togashi, Yuri-gun (JP); Tatsuya Fukunaga, Yuri-gun (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/152,074

(22) Filed: Jun. 15, 2005

(65) Prior Publication Data

US 2005/0286205 A1 Dec. 29, 2005

(30) Foreign Application Priority Data

Jun. 29, 2004 (JP) .............................. 2004-192071

(51) Int. Cl.
*H01G 4/005* (2006.01)

(52) U.S. Cl. ................ 361/303; 361/306.3; 361/321.2; 361/301.3

(58) Field of Classification Search ................ 361/303, 361/306.1, 306.3, 308.1, 309–310, 321.2, 361/321.3, 329; 29/25.41, 25.42
See application file for complete search history.

(56) References Cited

U.S. PATENT DOCUMENTS 6,232,698 B1 * 5/2001 Kaida et al. ................. 310/320
6,849,145 B2 * 2/2005 Yamana et al. ........... 156/89.12

FOREIGN PATENT DOCUMENTS

| JP | A 2000-208361 | | 7/2000 |
| JP | 20000340447 A | * | 12/2000 |
| JP | A 2001-185441 | | 7/2001 |
| JP | A 2001-284171 | | 10/2001 |
| JP | 2004140183 A | * | 5/2004 |

* cited by examiner

*Primary Examiner*—Anthony Dinkins
(74) *Attorney, Agent, or Firm*—Oliff & Berridge, PLC

(57) ABSTRACT

A stacked capacitor includes a dielectric member, a plurality of internal electrodes, a plurality of extraction electrodes, and a plurality of external electrodes. The dielectric member is a stacked member formed of stacked dielectric layers and having a side surface. The internal electrodes are stacked alternately with the dielectric layers. The extraction electrodes have a width W1 and lead from the internal electrodes to the side surface. The external electrodes have a width W2 and are connected to the extraction electrodes at the first side surface. The extraction electrodes are separated from each other by a distance P. The widths W1 and W2 and distance P are set such that $0.6P \leq W1 < W2$ and $0.7P \leq W2 < P$.

3 Claims, 5 Drawing Sheets

| | | W2 | | | |
| --- | --- | --- | --- | --- | --- |
| | | 250 μm (0.5P) | 300 μm (0.6P) | 350 μm (0.7P) | 400 μm (0.8P) |
| W1 | 150 μm (0.3P) | 135 | 129 | 124 | 117 |
| | 200 μm (0.4P) | 129 | 122 | 115 | 110 |
| | 250 μm (0.5P) | 118 | 113 | 107 | 101 |
| | 300 μm (0.6P) | | 104 | 98 | 93 |
| | 350 μm (0.7P) | | | 90 | 84 |
| | 400 μm (0.8P) | | | | 76 |

(pH)

ESL>100pH

ESL≦100pH(W1≧0.6p,and,W2≧0.7P)

STACKED CAPACITOR

BACKGROUND OF THE INVENTION

1. Field of the Invention

The present invention relates to a stacked capacitor capable of reducing equivalent series inductance (ESL).

2. Description of Related Art

In recent years, power sources have supplied lower voltages to central processing units (CPUs) provided in digital electronic equipment in order to reduce power consumption. On the other hand, as the operating frequency of today's CPUs continue to increase, it has become necessary to supply larger load currents to the CPU.

When current flows the wire in the CPU, voltage drop is caused by inductance of the wire. If the load current changes abruptly, larger voltage drop is caused. If the power source applies a low voltage to the CPU, it is impossible to ignore the voltage drop since slight changes in the voltage can lead to CPU's malfunctions. Therefore, the importance of stabilizing the voltage increases.

A stacked capacitor called a decoupling capacitor is connected to the power source in the CPU for stabilizing the power source. When rapid transient changes in the load current occur, current is supplied to the CPU from the stacked capacitor through rapid charging and discharging of the capacitor, thereby suppressing voltage changes in the power supply.

However, the decoupling capacitor has an equivalent series inductance (ESL). The voltage change $\Delta V$ is expressed by $\Delta V = ESL \times di/dt$ (the di/dt expresses the change in current). On the other hand, as the operating frequency in today's CPUs continues to improve, the change in current di/dt is larger and occurs more rapidly. Therefore, the ESL of the decoupling capacitor itself greatly affects voltage changes since the change in current di/dt is large. Since voltage change in the power source can be suppressed by reducing this ESL, various forms of stacked capacitors capable of reducing ESL have been proposed.

Generally a stacked capacitor is constructed of a dielectric member having sheet-like dielectric layers stacked alternately with internal electrodes having a surface area smaller than that of the dielectric layers. An extraction electrode leads from the internal electrode to the outer surface of the dielectric member. When current is supplied to the internal electrodes through the extraction electrodes, the ESL is generated by the current flowing through the internal electrodes.

In a conventional stacked capacitor disclosed in Japanese patent application publication No. 2000-208361, for example, the paths through which current flows are shortened by increasing the width of the extraction electrodes, while decreasing the gaps therebetween. Shortening the current paths reduces magnetic flux generated by the current, which results in less ESL.

Another stacked capacitor disclosed in Japanese patent application publication No. 2001-185441 attempts to reduce ESL by optimizing the ratio of a length L and a width W of the extraction electrodes. In another conventional stacked capacitor disclosed in Japanese unexamined patent application publication No. 2001-284171, ESL is reduced by providing adjacent extraction electrodes with opposite polarities so that magnetic flux generated in adjacent extraction electrodes cancels out each other due to current flowing therethrough.

SUMMARY OF THE INVENTION

However, as the transmission of digital signals has become faster in recent years, digital devices capable of operating at clock frequencies over 1 GHz have emerged. Since the inductance component of the capacitor impedes rapid charging and discharging of the capacitor, the coupling capacitors used for the digital device operating at such high clock frequencies should have a small inductance component in order to keep up with rapid changes and large currents. When the decoupling capacitor is used in the power circuit of a CPU that operates at a frequency of 1 GHz or greater, it is preferable that the ESL is 100 pH or less.

In view of the foregoing, it is an object of the present invention to provide a stacked capacitor for supplying a stable voltage to a CPU or the like while suppressing the ESL to no more than 100 pH.

In order to attain the above object, the present invention provides a stacked capacitor including a dielectric element, a plurality of internal electrodes, a plurality of extraction electrodes, and a plurality of external electrodes. The dielectric element has at least one side surface and a plurality of stacked sheet-like dielectric layers each defining a predetermined surface area. The plurality of internal electrodes is alternately stacked with the dielectric layers. Each internal electrode has a conductor falling within the predetermined surface area and a first edge positioned near the one side surface. The dielectric layers and the internal electrodes define a stacking direction. Each extraction electrodes extends from each first edge to the one side surface without contact with one another, and has a width W1 at the one side surface in a direction orthogonal to the stacking direction. The distance P is defined between widthwise centers of neighboring extraction electrodes in the direction orthogonal to the stacking direction. The plurality of external electrodes is provided on the side surface and extends in the stacking direction and is arrayed in the orthogonal direction. Each external electrode has a width W2 on the side surface in the orthogonal direction and is connected to a corresponding extraction electrode. The widths W1 and W2 and the distance P are set such that $0.6P \leq W1 < W2$ and $0.7P \leq W2 < P$.

It is preferable that the stacked capacitor further has insulating layers formed on the side surface and each being positioned between the adjacent external electrodes.

It is preferable that at least two extraction electrodes extend from each internal electrode.

BRIEF DESCRIPTION OF THE DRAWINGS

The above and other objects, features, and advantages of the invention will become more apparent from reading the following description of the preferred embodiments taken in connection with the accompanying drawings in which.

DETAILED DESCRIPTION OF THE PREFERRED EMBODIMENTS

Figures 1, 3:
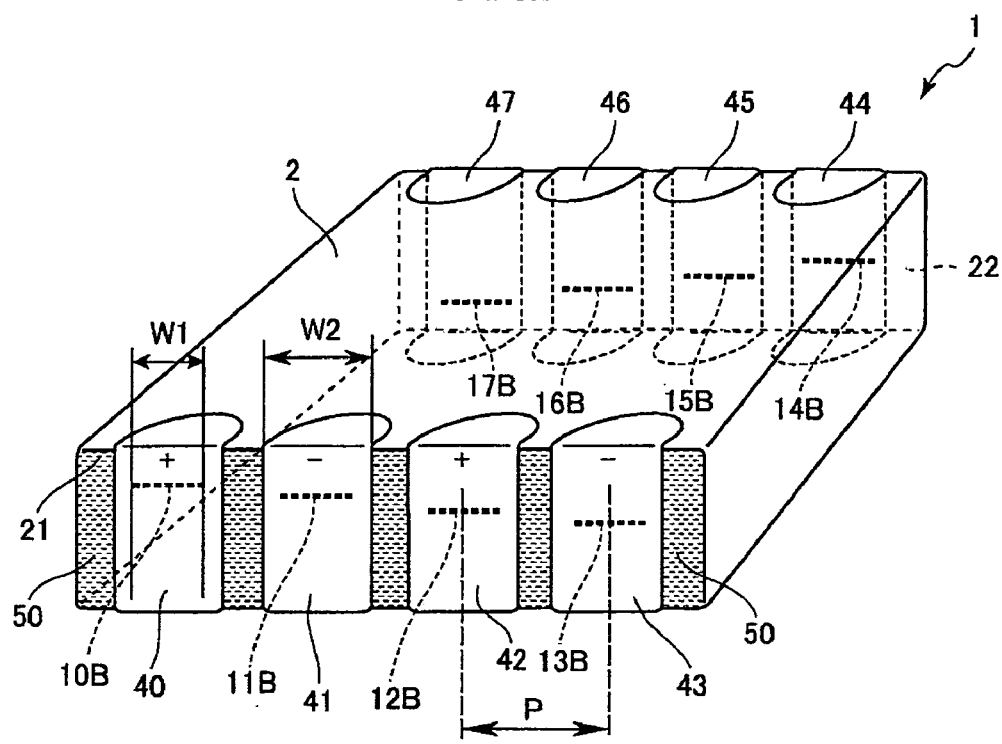
FIG. 1 is a perspective view showing a stacked capacitor according to a preferred embodiment of the present invention.
FIG. 3 is a table of experimental data showing changes in ESL when widths W1 and W2 change within prescribed ranges.
Figure 2:
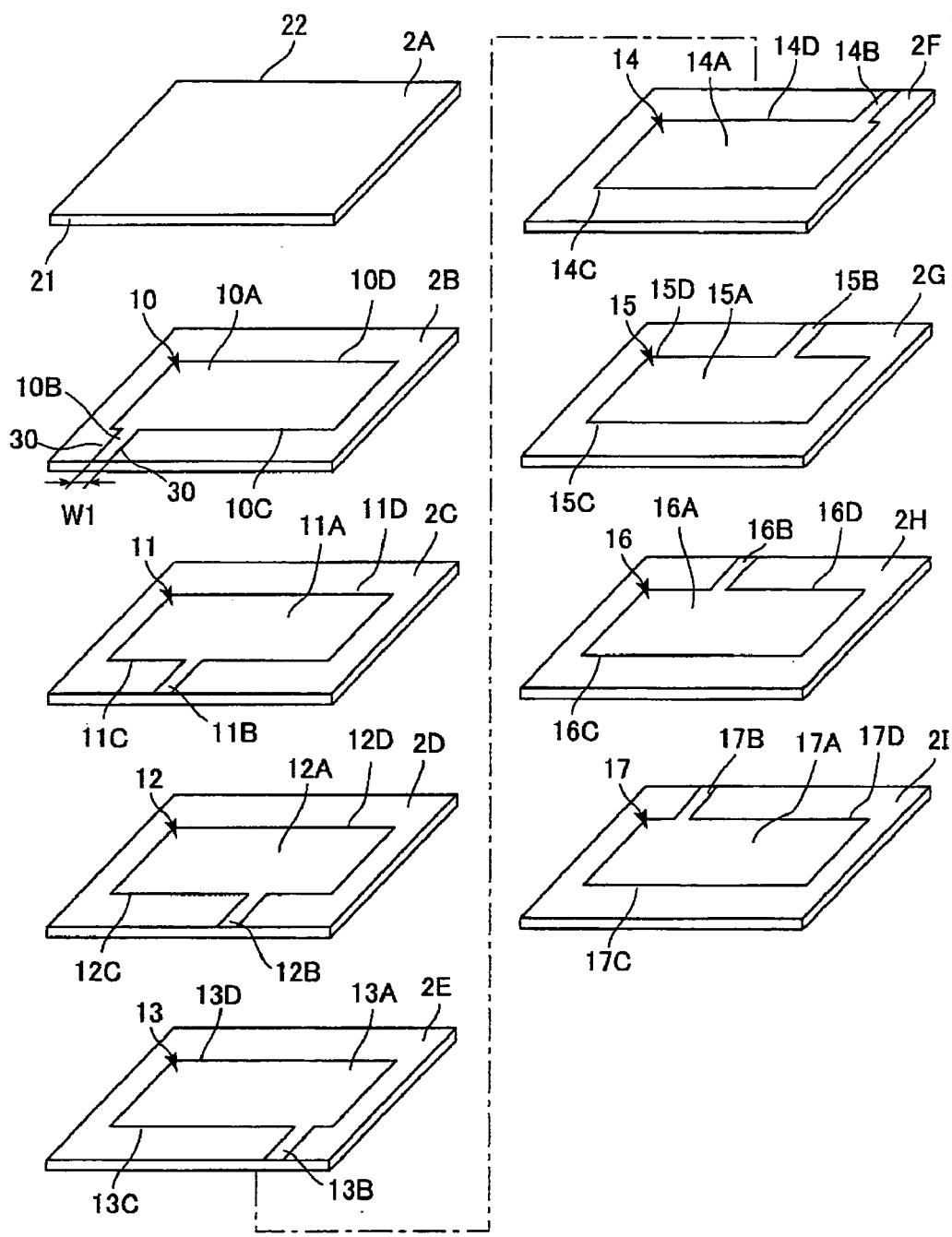
FIG. 2 is an exploded perspective view of the stacked capacitor according to the first embodiment.

A stacked capacitor 1 according to a preferred embodiment of the present invention will be described while referring to FIGS. 1 and 2. As shown in FIGS. 1 and 2, the stacked capacitor 1 includes a dielectric member 2, and first through eighth electrodes 10–17. The dielectric member 2 is constructed by stacking sheet-like dielectric layers 2A–2I that are substantially rectangular in shape. The dielectric member 2 has a first side surface 21 and a second side surface 22 opposing the first side surface 21 (only indicated for the dielectric layer 2A in FIG. 2). The dielectric member 2 is manufactured by stacking ceramic green sheets serving as the dielectric layers 2A–2I and sintering the stacked structure. To use the sintered assembly as a capacitor, external electrodes 40–47 are subsequently formed on the side surfaces of the dielectric member 2.

The first through eighth electrodes 10–17 are formed of a base metal such as nickel or a nickel alloy, copper or a copper alloy, or a metal alloy having one of these metals as the primary component. The first through eighth electrodes 10–17 are disposed on top of each of the dielectric layers 2B–2I, but not on the dielectric layer 2A. In this manner, the dielectric layers 2A–2I and electrodes 10–17 are stacked alternately. Each of the first through eighth electrodes 10–17 is provided one-to-one correspondence with internal electrodes 10A–17A and extraction electrodes 10B–17B. Each of the internal electrodes 10A–17A is substantially similar in shape, and falls within the surface area of the dielectric layers 2A–2I so as to overlap one another substantially in the stacking direction. Each of the internal electrodes 10A–17A is provided one-to-one correspondence with first edges 10C–17C positioned near the first side surface 21, and second edges 10D–17D positioned near the second side surface 22.

The extraction electrodes 10B–13B lead from the first edges 10C–13C to the first side surface 21 of the dielectric member 2 at positions that do not overlap in the stacking direction. The extraction electrodes 14B–17B lead from the second edges 14D–17D to the second side surface 22 of the dielectric member 2 at positions that do not overlap in the stacking direction. The extraction electrodes that are adjacent to one another in the stacking direction are also adjacent to one another on the first side surface 21 in a direction orthogonal to the stacking direction (hereinafter referred to as "orthogonal direction").

The extraction electrodes 10B–17B are substantially identical in shape and have two edges 30 that determine a width W1 of the extraction electrodes 10B–17B in the orthogonal direction. On the other hand, extraction electrodes adjacent in the orthogonal direction are separated by a distance P in the orthogonal direction. The distance P indicates the distance between centers of adjacent extraction electrodes in the orthogonal direction.

The external electrodes 40–43 are disposed on the first side surface 21 and spaced at prescribed intervals in the orthogonal direction and are connected one-to-one correspondence to the extraction electrodes 10B–13B. The external electrodes 44–47 are disposed on the second side surface 22 and spaced at prescribed intervals in the orthogonal direction and are connected one-to-one correspondence to the extraction electrodes 14B–17B. The external electrodes 40–47 are substantially identical in shape, each having a width W2 in the orthogonal direction. The widths W1 and W2 and the distance P are set such that $0.6P \leq W1 < W2$ and $0.7P \leq W2 < P$. Insulating layers 50 are also provided between adjacent external electrodes. These insulating layers 50 can prevent short circuits caused by solder bridges or the like that are formed across gaps between adjacent external electrodes during a mounting process.

With this construction, the stacked capacitor 1 is used with the external electrodes 40, 42, 44, and 46 connected to the power supply, and the external electrodes 41, 43, 45, and 47 connected to ground.

Next, the reason for setting the widths W1 and W2 and the distance P such that $0.6P < W1 < W2$ and $0.7P < W2 < P$ will be described. Current generates magnetic flux. In this embodiment, since current flows in opposite directions in extraction electrodes that are adjacent to one another in the stacking direction, the magnetic flux are generated in opposite directions in extraction electrodes that are adjacent to one another in the stacking direction. Therefore, the magnetic flux in the extraction electrodes cancels out one another, thereby reducing ESL in the stacked capacitor 1. It is desirable to set the distance P as short as possible to increase magnetic coupling, thereby increasing the amount of cancelled magnetic flux.

On the other hand, it is desirable to set the width W1 wide. Widening the width W1 narrows the gap between extraction electrodes in the orthogonal direction, increasing the amount of cancelled magnetic flux. The width W2 of the external electrodes should also be wide for the same reason that the width W1 is widened.

However, if the width W1 becomes not less than the width W2, the external electrodes cannot completely cover the extraction electrodes, increasing the likelihood of solder bridges between extraction electrodes that can lead to short circuits. Therefore, it is necessary to set the width W1 less than the width W2. On the other hand, if the width W2 becomes greater than or equal to the distance P, adjacent external electrodes may come into contact with one another. Therefore, the width W2 must be set less than the distance P. Hence, the inventors of the present invention studied changes in the ESL of the stacked capacitor 1 while varying the widths W1 and W2 within the prescribed ranges described above.

Figure 4A:
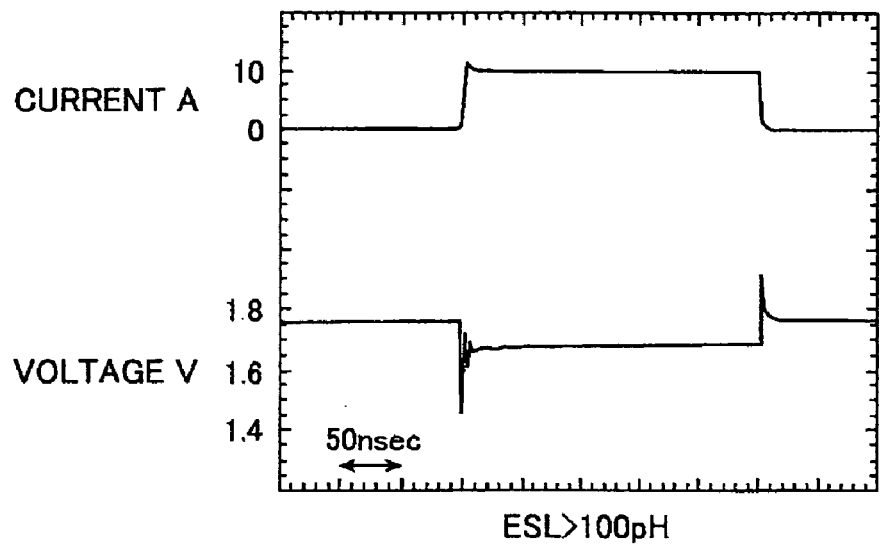
FIG. 4(a) is a graph showing the relationship between a voltage V and a current A when ESL is greater than 100 pH.
Figure 4B:
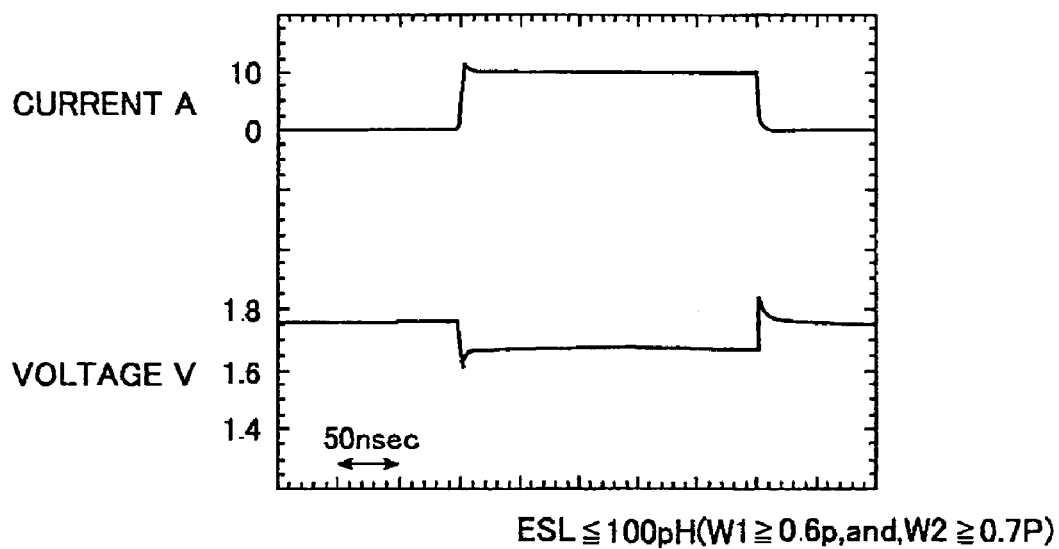
FIG. 4(b) is a graph showing the relationship between a voltage V and a current A when ESL is less than or equal to 100 pH.

FIG. 3 shows the findings of this study on the changes in ESL. A 2012-size stacked capacitor was used in this experiment, with the distance P set at 500 μm. Here, 2012-size signifies that the product's dimensions are 2.0×1.25×1.25 mm. As shown in FIG. 3, the ESL is below 100 pH only when the width W1 is greater than or equal to 0.6 P and the width W2 greater than or equal to 0.7 P FIG. 4(a) shows the relationship between a voltage V and an electric current A supplied to a digital device operating at a low voltage and a frequency of 1 GHz or greater when the ESL is greater than 100 pH. FIG. 4(b) shows the relationship between the voltage V and the electric current A supplied to a digital device operating at a low voltage and a frequency of 1 GHz or greater when the ESL is less than or equal to 100 pH ($W1 \geq 0.6P$ and $W2 \geq 0.7P$). As shown in the drawings, changes in the voltage V accompanying changes in the current A are greater when the ESL is over 100 pH than when the ESL is less than or equal to 100 pH. Hence, W1 is set greater than or equal to 0.6 P and W2 greater than or equal to 0.7 P in order to regulate voltage fluctuations.

Based on these findings, setting the widths W1 and W2 and the distance P such that $0.6P \leq W1 < W2$ and $0.7P \leq W2 < P$ can keep the ESL to a value less than or equal to 100 pH while preventing short circuits caused by solder in a 2012-size stacked capacitor. Accordingly, this construction can regulate changes in voltage supplied to the CPU.

Figure 5:
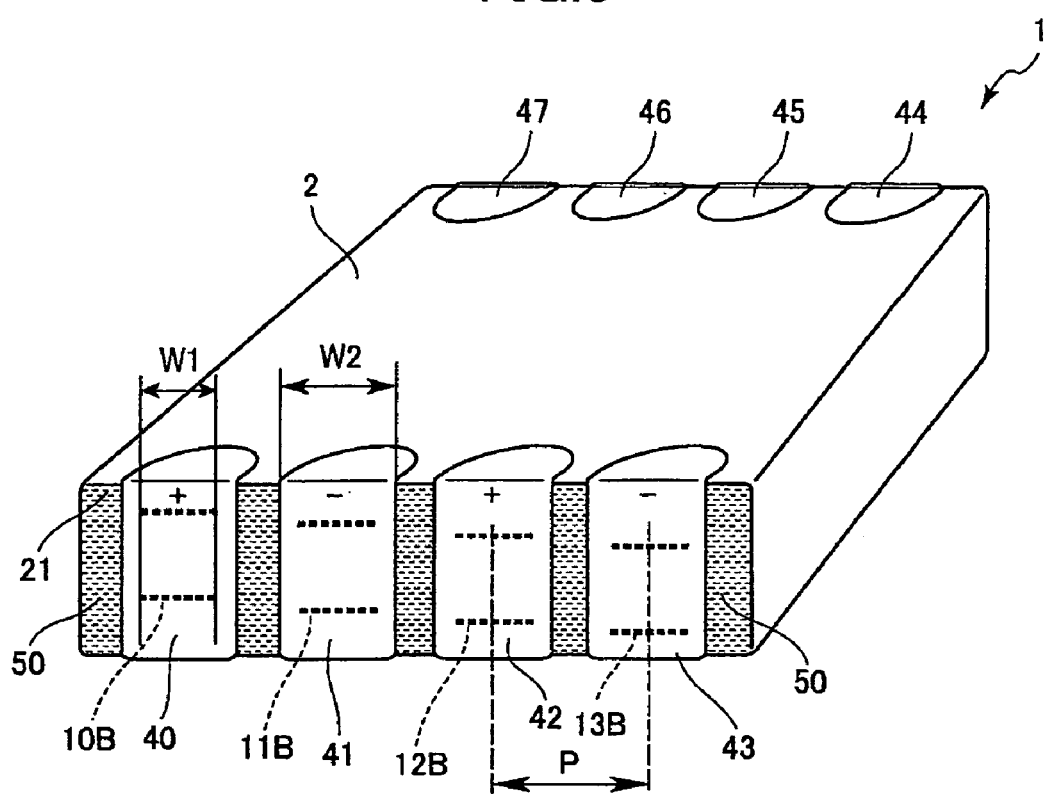
FIG. 5 is a perspective view of the stacked capacitor according to a first modification to the preferred embodiment, wherein the number of layers has been increased.
Figure 6:
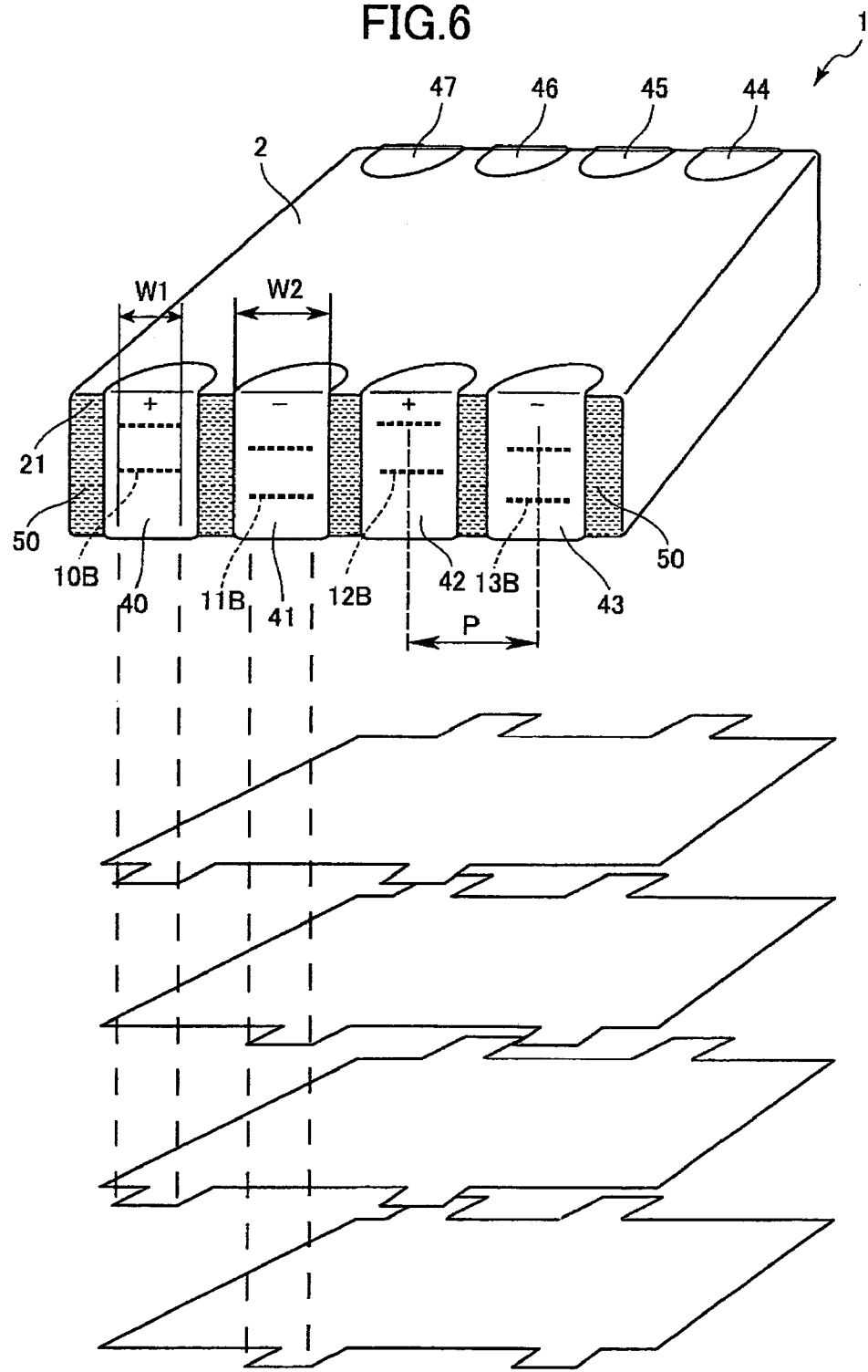
FIG. 6 is a perspective view of the stacked capacitor according to a second modification to the preferred embodiment, wherein a plurality of extraction electrodes leads out from a single internal electrode.

A first modification is shown in FIG. 5, where another set of the dielectric layers 2B–2I shown in FIG. 2 is added to the original stack. Further, a second modification is shown in FIG. 6, where upper half is a perspective view of the stacked capacitor and lower half is an exploded perspective view of the stacked capacitor. In the second modification, a plurality of extraction electrodes is led from a single internal electrode. In this case, the extraction electrodes leading from the same internal electrode have the same polarity.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A stacked capacitor comprising:
   a dielectric element having at least one side surface and comprising a plurality of stacked sheet-like dielectric layers each defining a predetermined surface area;
   a plurality of internal electrodes alternately stacked with the dielectric layers, each internal electrode comprising a conductor falling within the predetermined surface area and having a first edge positioned near the one side surface, the dielectric layers and the internal electrodes defining a stacking direction;
   a plurality of extraction electrodes each extending from each first edge to the one side surface without contact with one another, and having a width W1 at the one side surface in a direction orthogonal to the stacking direction, a distance P being defined between widthwise centers of neighboring extraction electrodes in the direction orthogonal to the stacking direction;
   a plurality of external electrodes provided on the side surface and extending in the stacking direction and arrayed in the orthogonal direction, each external electrode having a width W2 on the side surface in the orthogonal direction and being connected to a corresponding extraction electrode; and
   wherein the widths W1 and W2 and the distance P are set such that $0.6P \leq W1 < W2$ and $0.7P \leq W2 < P$.

2. The stacked capacitor according to claim 1, further comprising insulating layers formed on the side surface and each being positioned between the adjacent external electrodes.

3. The stacked capacitor according to claim 1, wherein at least two extraction electrodes extend from each internal electrode.

* * * * *